United States Patent [19]

Buschbom et al.

[11] Patent Number: 4,553,664
[45] Date of Patent: Nov. 19, 1985

[54] APPARATUS FOR TENSIONING A BELT

[75] Inventors: Floyd E. Buschbom, Long Lake; Glen D. Hansen, Maple Plain, both of Minn.

[73] Assignee: Veda, Inc., Long Lake, Minn.

[21] Appl. No.: 567,147

[22] Filed: Jan. 3, 1984

Related U.S. Application Data

[60] Continuation of Ser. No. 215,314, Dec. 11, 1980, abandoned, which is a division of Ser. No. 115,608, Jan. 28, 1980, Pat. No. 4,320,825.

[51] Int. Cl.$^4$ ............................................. B65G 23/44
[52] U.S. Cl. ................................... 198/814; 198/835; 248/657; 474/115
[58] Field of Search ............... 198/814, 835; 474/109, 474/110, 113-117; 248/651, 657

[56] References Cited

U.S. PATENT DOCUMENTS

| | | | |
|---|---|---|---|
| 1,706,501 | 3/1929 | Smith | 198/835 |
| 2,074,595 | 3/1937 | shackelford | 198/835 |
| 2,341,273 | 2/1944 | Helberg | 474/110 |
| 2,710,683 | 6/1955 | McClenny, Jr. | 198/184 |
| 2,724,492 | 11/1955 | Kolbe | 198/814 |
| 2,833,597 | 5/1958 | Sloyan | 474/115 |
| 2,910,879 | 11/1959 | Hanks | 248/657 |
| 3,237,807 | 3/1966 | Garvey | 198/364 |
| 3,437,192 | 4/1969 | Cauffman | 198/364 |
| 3,590,983 | 7/1971 | Oury | 198/364 |
| 3,773,166 | 11/1973 | Nowacki | 198/493 |
| 3,893,646 | 7/1975 | Sloyan | 474/115 |
| 3,905,473 | 9/1975 | Jones et al. | 198/718 |
| 4,344,598 | 8/1982 | Sloyan | 474/115 |

OTHER PUBLICATIONS

Brochure—"Farm-Eze".

Primary Examiner—Joseph E. Valenza
Attorney, Agent, or Firm—Burd, Bartz & Gutenkauf

[57] ABSTRACT

A livestock feeding apparatus having an endless belt supported on an elongated table above a feed bunk by a plurality of stands. The stands are laterally and vertically adjustable to level the apparatus and accommodate different sized bunks. The belt has an upper run that rides on a wood deck secured to the support. An idler pulley and drive pulley engages one end of the belt opposite ends. The belt is retained in driving engagement with the drive pulley by a driven roller engageable with the lower run of the belt adjacent the drive pulley. A motor drives the roller at a speed so that the surface speed of the roller is greater than the linear speed of the belt to maintain the lower portion of the run of the belt between the roller and the drive pulley under tension. A sweep assembly slidably mounted on the wood deck operates to move the material off of the side of the top run of the belt into the bunk. The sweep assembly has a roller located in driving engagement with the upper run of the belt and an angularly located drum. Coacting drive members drivably connect the roller with the drum so that on rotation of the roller the drum is rotated to move material off the side of the belt. A reversible motor drivably connected with a cable to the sweep assembly operates to reciprocate the sweep assembly between opposite ends of the support. A belt tightening assembly associated with the pulleys maintains the belt under tension. The belt tensioning assembly includes biasing springs and a linear actuator that adjusts the biasing force on the springs to maintain tension on the belt. A diverter assembly attached to the sweep assembly has a pivotally mounted chute movable to opposite inclined positions to selectively direct the material to opposite sides of the feed bunk.

10 Claims, 13 Drawing Figures

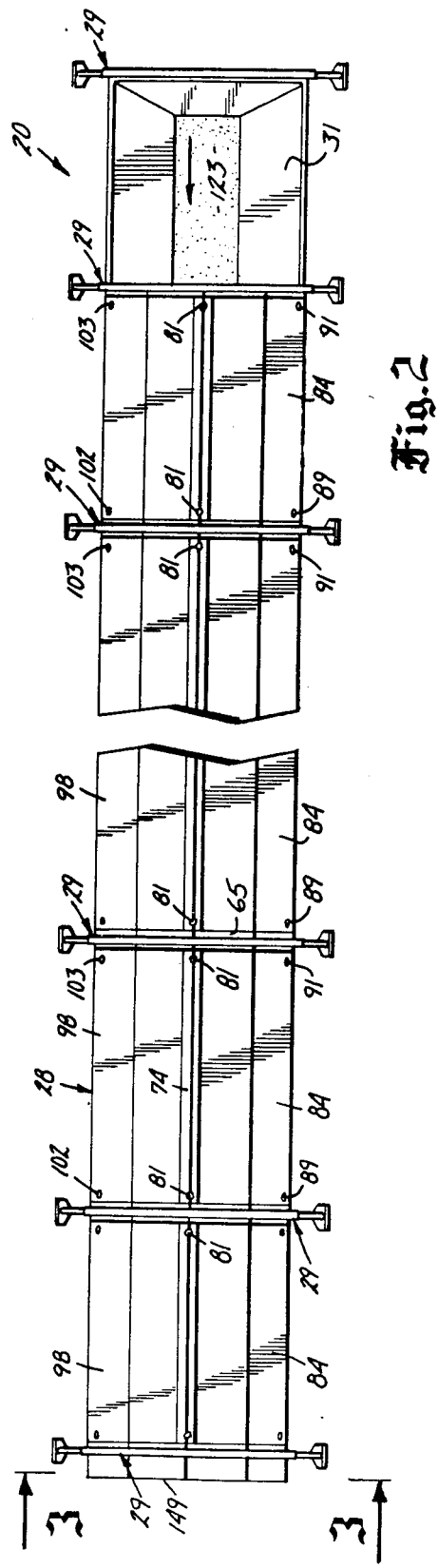

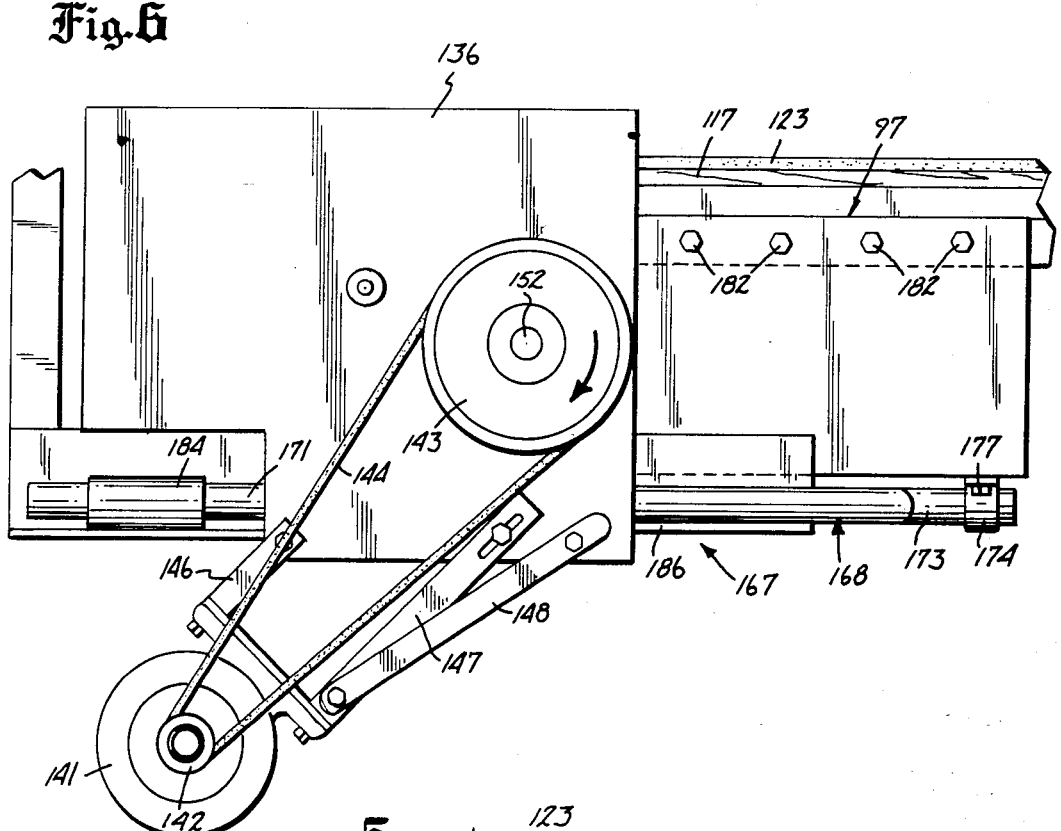
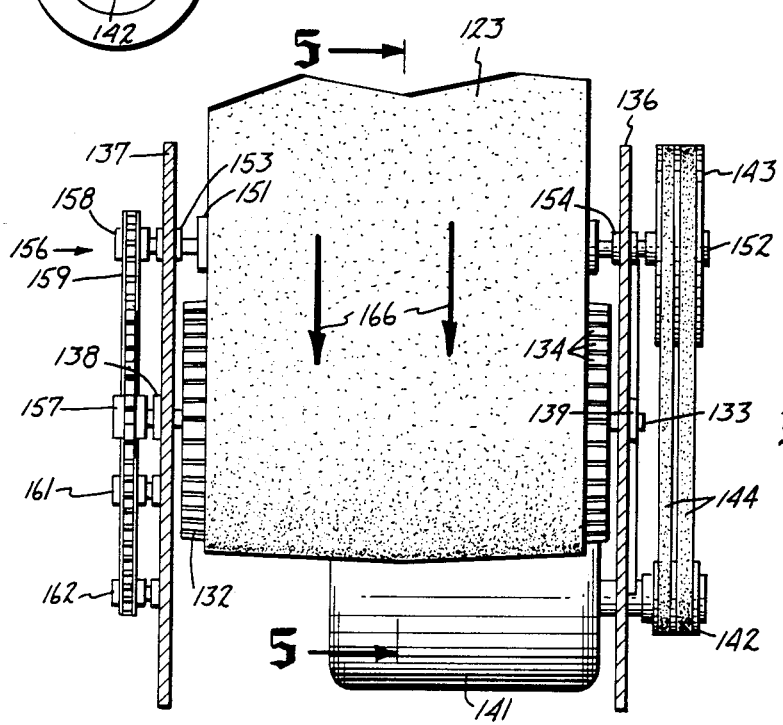

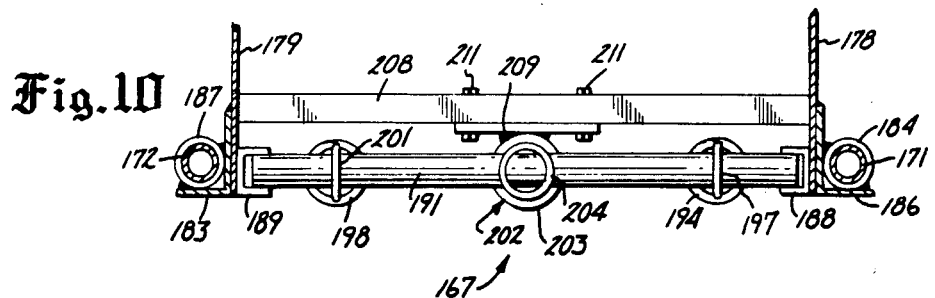
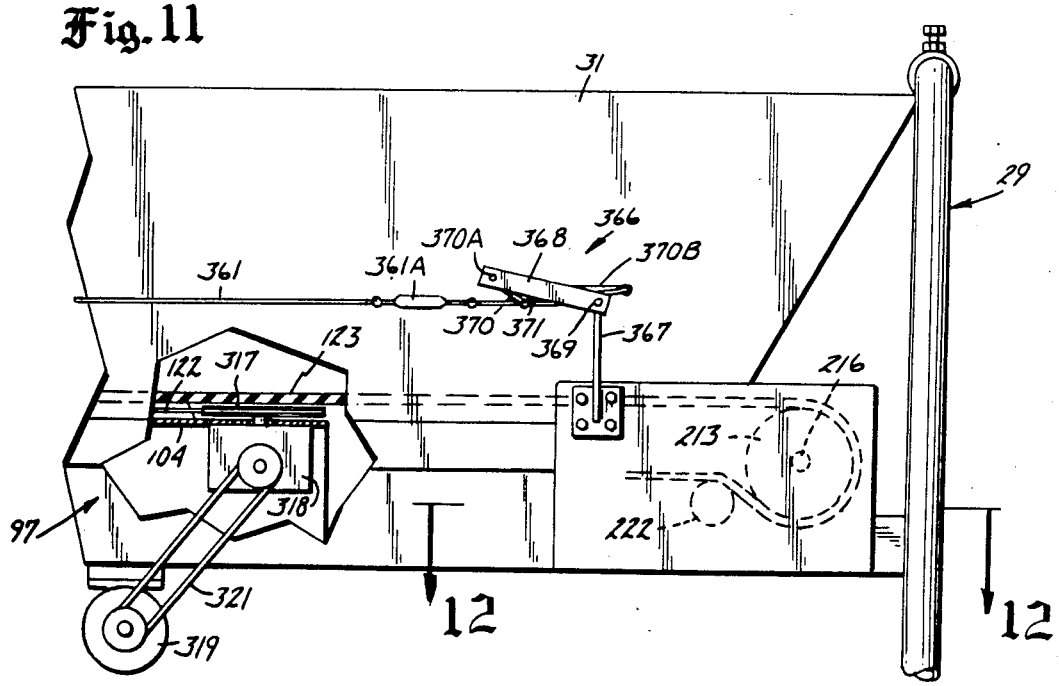

4,553,664

APPARATUS FOR TENSIONING A BELT

This application is a continuation of U.S. Application Ser. No. 215,314, filed Dec. 11, 1980, now abandoned. Application Ser. No. 215,314 is a division of U.S. Application Ser. No. 115,608 filed Jan. 28, 1980, now U.S. Pat. No. 4,320,825.

SUMMARY OF INVENTION

The invention is directed to a material conveying apparatus for moving material in elongated paths and depositing the material in a selected location. More particularly, the invention is directed to a belt type feeder for dispensing an elongated ribbon of feed into a livestock feeding bunk.

The belt is maintained under tension by a belt tensioning apparatus. The belt tensioning apparatus has a first means movably mounted on the support and attached to the drive pulley. A second means is movably mounted on the support adjacent the first means. Biasing means connect the first means with the second means. An adjustable means, as a linear actuator, is connected to the second means and is operable to adjust the tension of the biasing means thereby adjusting the tension on the belt. In a short conveyor assembly the idler pulley can be mounted to fixed frame structure that is attached directly to the support. A conveyor assembly that has considerable length is provided with a belt tensioning apparatus associated with the drive pulley and idler pulley. The belt tensioning apparatus has biasing means associated with adjustable means to vary the tension of the biasing means and thereby control the tension of the belt from both ends of the belt. The belt tensioning apparatus operates to automatically compensate for changes in belt length or belt stretch. The adjustable means is also used to release the tension on the belt.

IN THE DRAWINGS

FIG. 2 is a fragmentary top plan view of FIG. 1;

FIG. 4 is an enlarged sectional view taken along the line 4—4 of FIG. 3;

FIG. 6 is a right side elevational view of FIG. 4;

FIG. 10 is a sectional view taken along the line 10—10 of FIG. 7;

FIG. 11 is a side elevational view partly sectioned of the hopper and of the material conveying apparatus of FIG. 1;

DESCRIPTION OF PREFERRED EMBODIMENT

Figure 1:
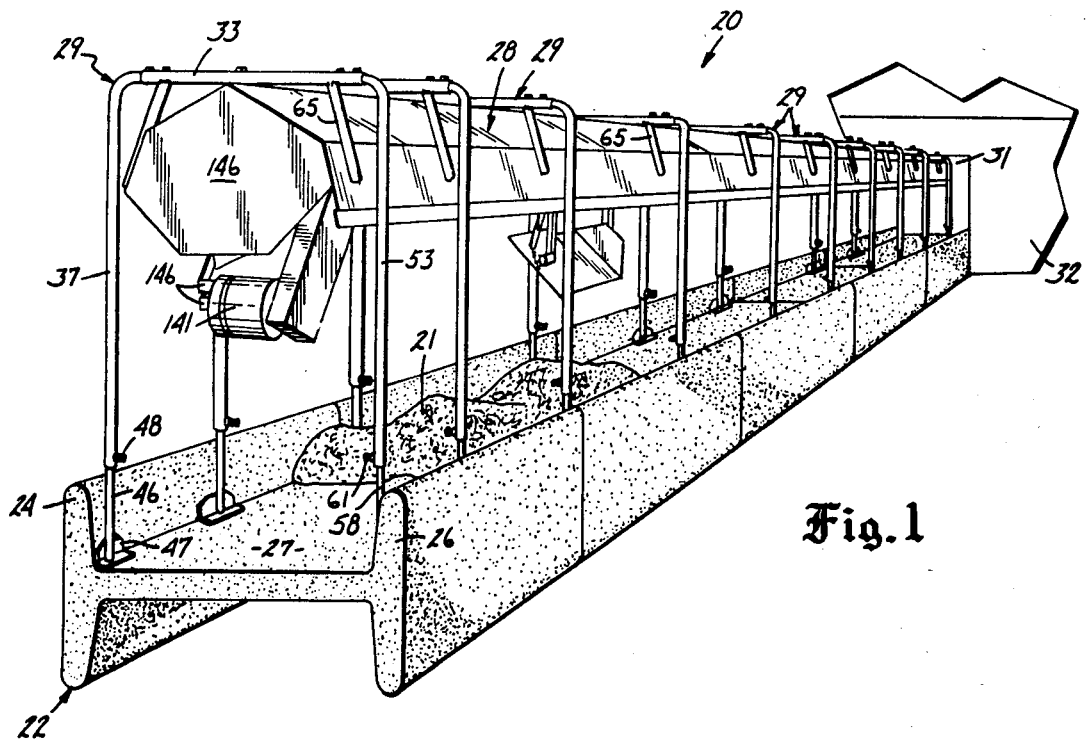
FIG. 1 is a perspective view of the material conveying apparatus of the invention mounted on an elongated feed bunk.

Referring to FIG. 1, there is shown the material conveying apparatus of the invention indicated generally at 20 operable to carry material 21 to an elongated material receiver indicated generally at 22, such as a feed bunk. The apparatus is a material conveying machine useable to move particulate and granular type materials. These materials can be animal feeds, fertilizers, earth, sand, gravel, granular metal and plastic, sawdust and the like. The following description is directed to apparatus 20 used to convey and discharge animal feeds into a feed bunk 22. Other uses of the apparatus are not to be precluded.

Bunk 22 has a generally horizontal base or platform 23 joined at its opposite edges to upright side walls 24 and 26. Side walls 24 and 26 extend above the plane of base 23 and form a material receiving location or feeding area 27. The lower ends of the side walls 24 and 26 rest on a supporting surface, such as the ground or a concrete slab. Bunk 22 is made up of generally end-to-end bunk units to form an elongated feeding area. Bunk 22 is made of rigid material, as concrete. Other materials can be used to make bunk 22. Also, other types of bunks or material receiving structures can be used with the material conveying apparatus 20.

Apparatus 20 has an elongated conveyor assembly indicated generally at 28 located above bunk 22. A plurality of stands or supports indicated generally at 29 support conveyor assembly 28 in an elevated position above bunk 22 so that conveyor assembly 28 functions to discharge material in an elongated ribbon or row into feeding area 27. Apparatus 20 is operable to dispense particulate materials, including, but not limited to, animal feeds comprising a mixture of a concentrate and roughages. The roughages can be silage, haylage, and the like. The concentrates include ground grains, minerals, and grain meals. A large open top hopper 31 is located at the one end of conveyor assembly 28 for receiving the material. The material may be discharged from a structure 32, as a silo, bin or barn, or a self-unloading feed wagon, conveyor, or the like.

Figure 3:
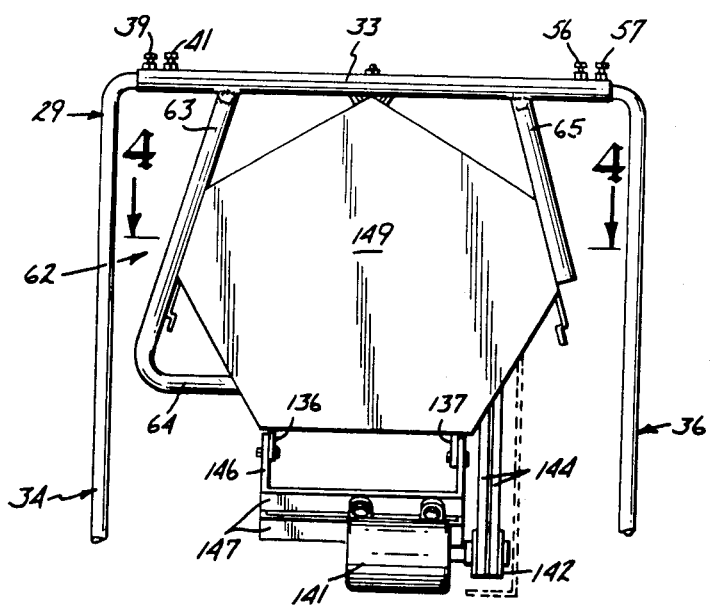
FIG. 3 is an enlarged end elevational view of the left end of the material conveying apparatus of FIG. 2 taken along the line 3—3 and looking in the direction of the arrow.

As shown in FIG. 3, the drive end or rear of conveyor assembly 28 is closed with an upright cover 149. Referring to FIG. 4, the drive end of the conveyor assembly 28 has a drive pulley indicated generally at 132 accommodating belt 123. Pulley 132 has a shaft 133, circular end members 133A, and a plurality of circumferentially spaced bars 134 attached by welds to end members 133A. Bars 134 are in a generally cylindrical arrangement with adjacent bars being spaced from each other to provide an open pulley. Bars 134 have a slight outwardly convex shape providing the pulley with a generally central crown to maintain belt 123 in central driving relation with pulley 132. Pulley 132 is located between side plates 136 and 137. A bearing 138 rotatably mounts shaft 133 on plate 136. Bearing 139 rotatably mounts shaft 133 on plate 137.

Figure 5:
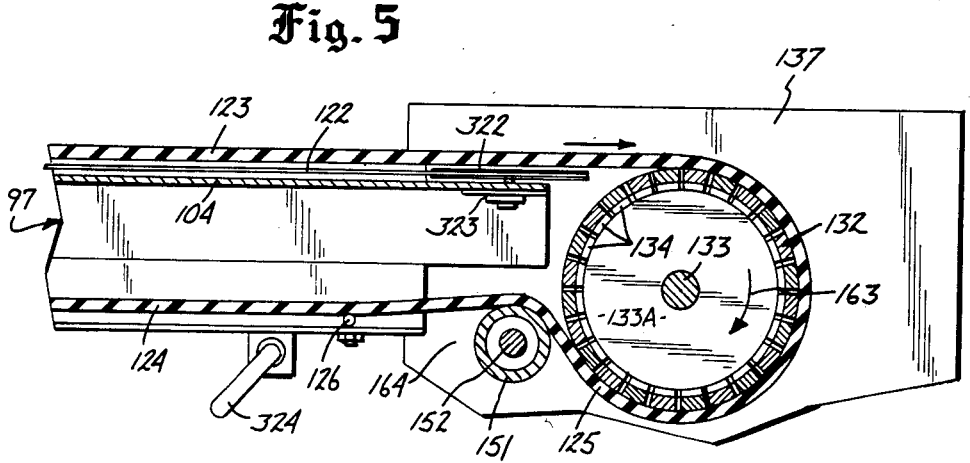
FIG. 5 is a sectional view taken along the line 5—5 of FIG. 4.

As shown in FIGS. 4 and 5, a transverse roller 151 engages the lower run 124 of belt 123 adjacent the drive pulley 132. A roller 151 is located in a position so that belt 123 engages more than a 180 degree sector of the pulley 132. This increases the area of the pulley that engages the inside of the belt 123 and increases the driving effectiveness of pulley 132. Roller 151 has a transverse shaft 152 rotatably mounted on plates 136 and 137 with bearing 153 and 154.

Pulley 132 is rotated with a motor 141, as an electric motor, located below pulley 132. The power is transmitted from motor 141 to shaft 152 with a drive pulley 142 mounted on the motor drive shaft, a driven pulley 143 mounted on shaft 152 and a plurality of belts 144 drivably connecting the pulleys 142 and 143. Motor 142 is attached to U-shaped mounts 146 and 147 that are secured by nut and bolt assemblies to plates 136 and 137. As shown in FIG. 6, a strut 148 is attached to mount 147 and plate 136 to hold the motor in an adjusted position and thereby control the tension of belts 144.

Figure 7:
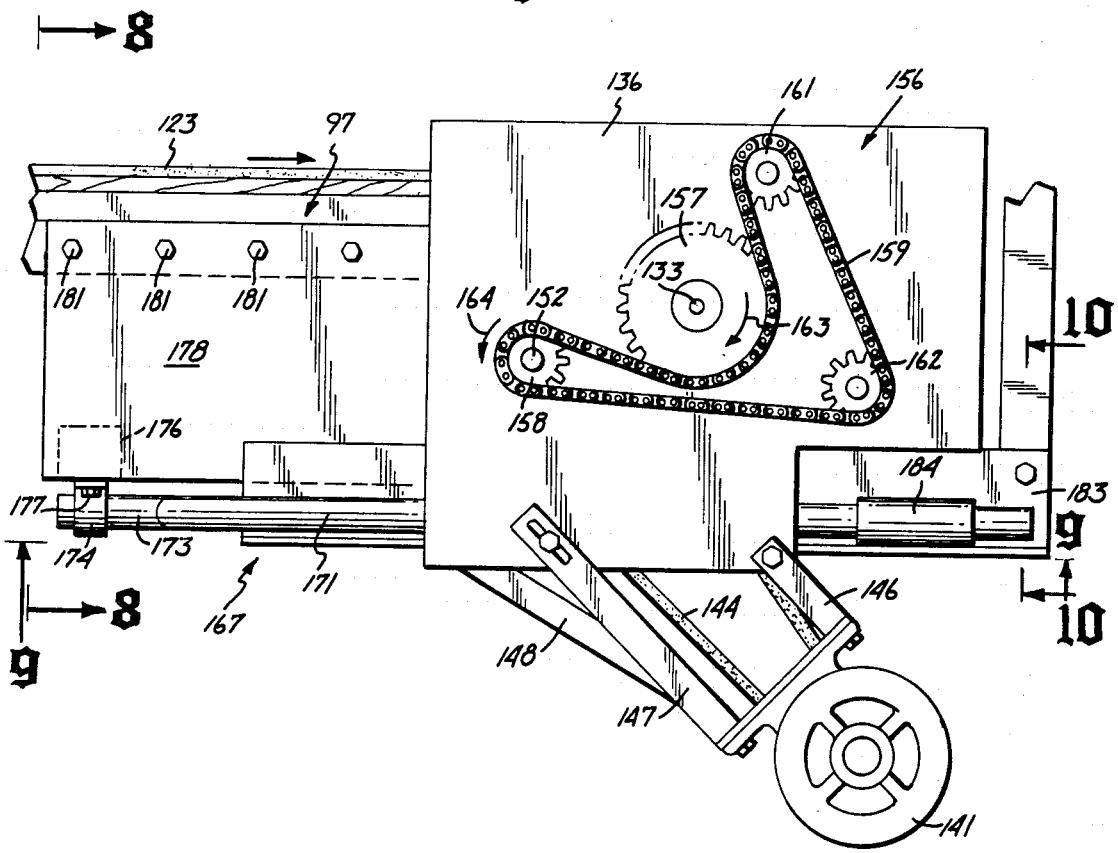
FIG. 7 is a left side elevational view of FIG. 4.

Referring to FIG. 7, a power transmission means indicated generally at 156 drivably connects the drive pulley shaft 133 with roller 151. Power transmission means 156 has a first sprocket 157 mounted on shaft 133. A second sprocket 158 is mounted on shaft 152. An endless roller link chain 159 is trained about the sprockets 157 and 158 and a pair of idler sprockets 161 and 162. Sprocket 158 is driven by motor 141 in a counterclockwise direction, as shown by arrow 164. Sprocket 157 is driven from sprocket 158 via chain 159 in a clockwise direction, indicated by arrow 163. Roller 151 is driven at a speed so that the speed of the outer surface of roller 151 that engages the lower run 124 of the belt 123 is faster than the speed of the inside surface of belt 123 that engages drive pulley 132. The outer surface of roller 151 is a continuous cylinder that has a linear speed in feet per minute that is faster than the linear speed of the belt 123. Thus, the roller 151 is continuously slipping on the belt thereby applying a pulling or tension force to belt segment 125. This difference in the linear surface speeds of roller 151 versus pulley 132 insures that the segment 125 of the belt 123 between pulley 132 and roller 151 is under tension. This insures firm engagement of belt 123 with the outer surface of pulley 132. Roller 151 is located forward of and above the bottom portion of drive pulley 132 so that belt 123 engages more than 180 degrees of pulley 132; for example, 200 degrees of the circumference of pulley 132. The location of roller 151 relative to pulley 132 can be changed to alter the contact arc of belt 123 on pulley 132.

Figure 8:
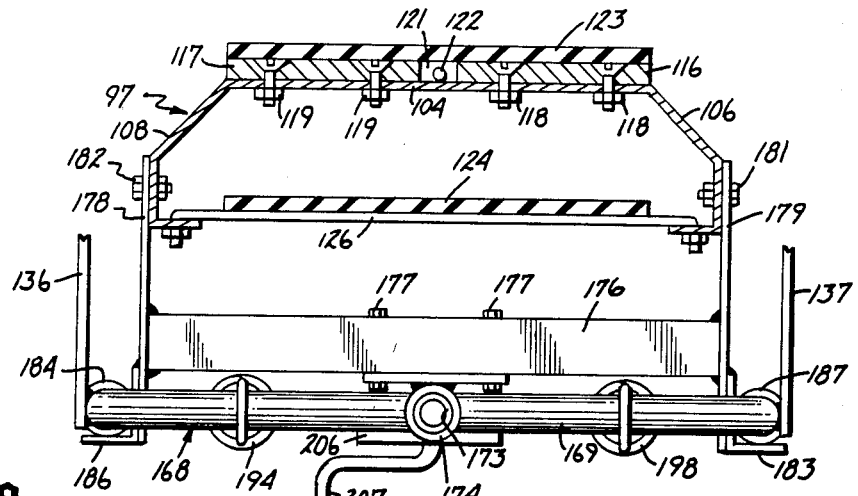
FIG. 8 is a sectional view taken along the line 8—8 of FIG. 7.

Referring to FIGS. 7-10, there is shown a belt tensioning assembly indicated generally at 167 operable to automatically maintain a selected tension on belt 123. Tension assembly 167 has a movable yoke 168 comprising a cross member or body 169 and a pair of rearwardly directed horizontal legs 171 and 172. A forwardly directed cylindrical neck 173 is secured to the center portion of cross member 169. Neck 173 extends through a sleeve 174 attached to a frame cross member 176 with a plurality of fasteners or bolts 177. Yoke 168 can move in a longitudinal direction relative to sleeve 174. The opposite ends of cross member 176 are attached to generally upright frame plates 178 and 179. As shown in FIG. 8, frame plates 178 and 179 are attached with a plurality of fasteners 181 and 182, respectively, to the opposite sides of table 97. Leg 171 is located adjacent an outwardly directed flange of an angle member 183 secured to frame plate 178. A horizontal sleeve 184 is secured to a rear portion of member 186 to accommodate a rear end portion of leg 171. Side plate 136 is secured to leg 171. Opposite side plate 137 is secured to leg 172 so that the side plates 136 and 137 move with yoke 168. A second angle member 183 is secured to the outside of frame plate 179. Angle member 183 is an outwardly directed flange located below leg 172. A sleeve 187 secured to angle member 183 slidably accommodates a rear end portion of leg 172.

Figure 9:
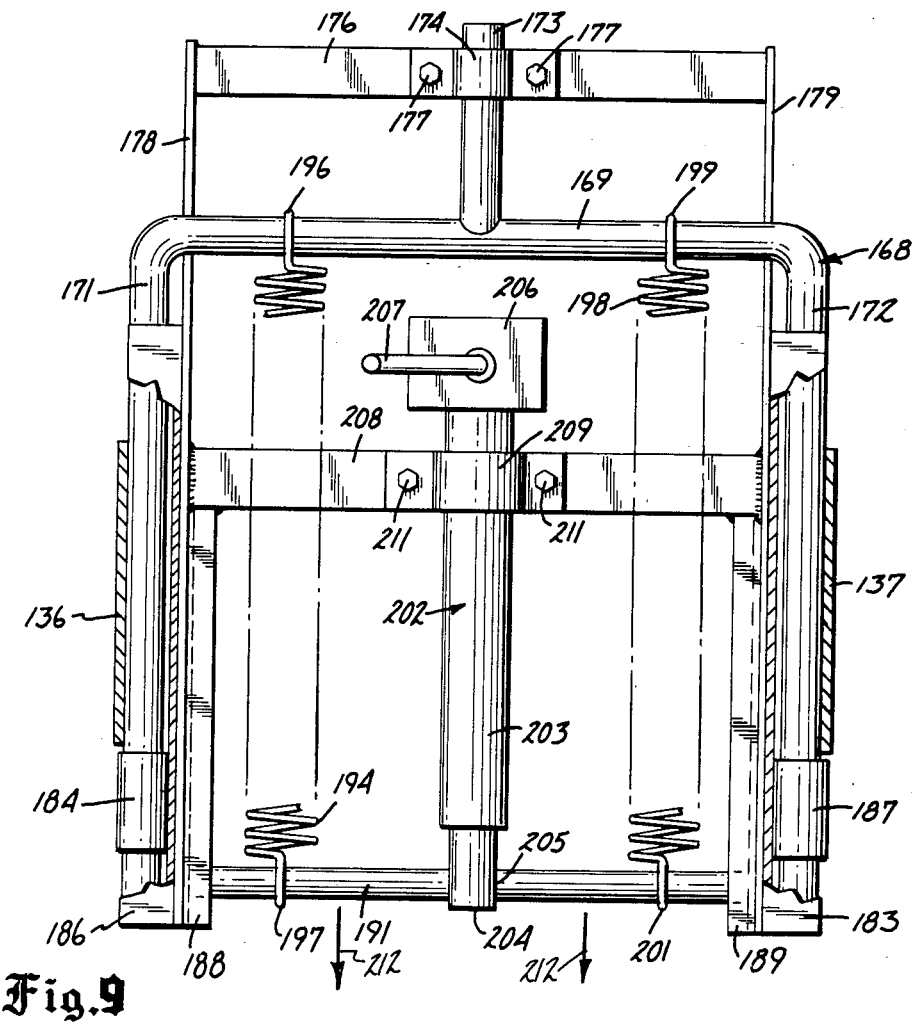
FIG. 9 is a sectional view taken along the line 9—9 of FIG. 7.

Referring to FIGS. 9 and 10, a first horizontal channel member 188 is secured to the inside of frame plate 178. Channel member 188 extends in a horizontal longitudinal direction and has an open channel or longitudinal groove 192 for slidably accommodating an end of a cross bar 191. The opposite end of cross bar 191 is located and cooperates with a second longitudinal horizontal channel member 189 secured to the inside of frame plate 179. Channel member 189 has a longitudinal channel or groove 193 accommodating the opposite end of cross bar 191. Yoke 168 is biased in a belt tightening direction by a pair of longitudinal tension springs 194 and 198. As shown in FIG. 9, spring 194 has a first hook end 196 located about cross member 169 and a second hook end 197 located about cross bar 191. Spring 198 has a first end 199 extended about the cross member 169 and a second hook end 201 extended about cross bar 191.

A longitudinal linear actuator indicated generally at 202 is located between and along the center line of yoke 168 and between springs 194 and 198. Linear actuator 202 has a cylindrical housing or casing 203 slidably accommodating a cylindrical moving member or piston 204. Member 204 has a transverse hole 205 accommodating the center portion of cross bar 191. A gear box 206 attached to housing 203 is operated with a hand crank 207 to selectively elongate or contract the piston 204. Housing 203 is secured to a fixed cross member 208 with a bracket 209 and a plurality of fasteners 211, such as nuts and bolts. Fasteners 211 clamp bracket 209 about housing 203 to fix the position of housing 203 on cross member 208. The opposite ends of cross member 208 are secured by welds to frame plates 178 and 179. Hand crank 207 is operable to rotate gear box 206 which, in turn, selectively moves piston 204 in or out of housing 203. This causes cross bar 191 to move along the channel members 188 and 189 in the direction of arrows 212, as shown in FIG. 17. Springs 194 and 198 transmit linear force to yoke 168 and thereby apply tension on belt 123 as drive pulley 132 is mounted on side plates 136 and 137. The belt tension is automatically maintained by the springs 194 and 198 as the belt stretches and contracts during use.

Referring to FIG. 11, the hopper end of belt 123 is trained about an idler pulley 213 located below and forward of the bottom or discharge opening of hopper 31. Pulley 213 is an open crowned pulley having a plurality of circumferentially arranged transverse bars and a transverse shaft 216. The lower run of the belt adjacent pulley 213 rides over a transverse roller 222. Roller 222 retains the belt 123 in more than 180 degree engagement with pulley 213.

Figure 12:
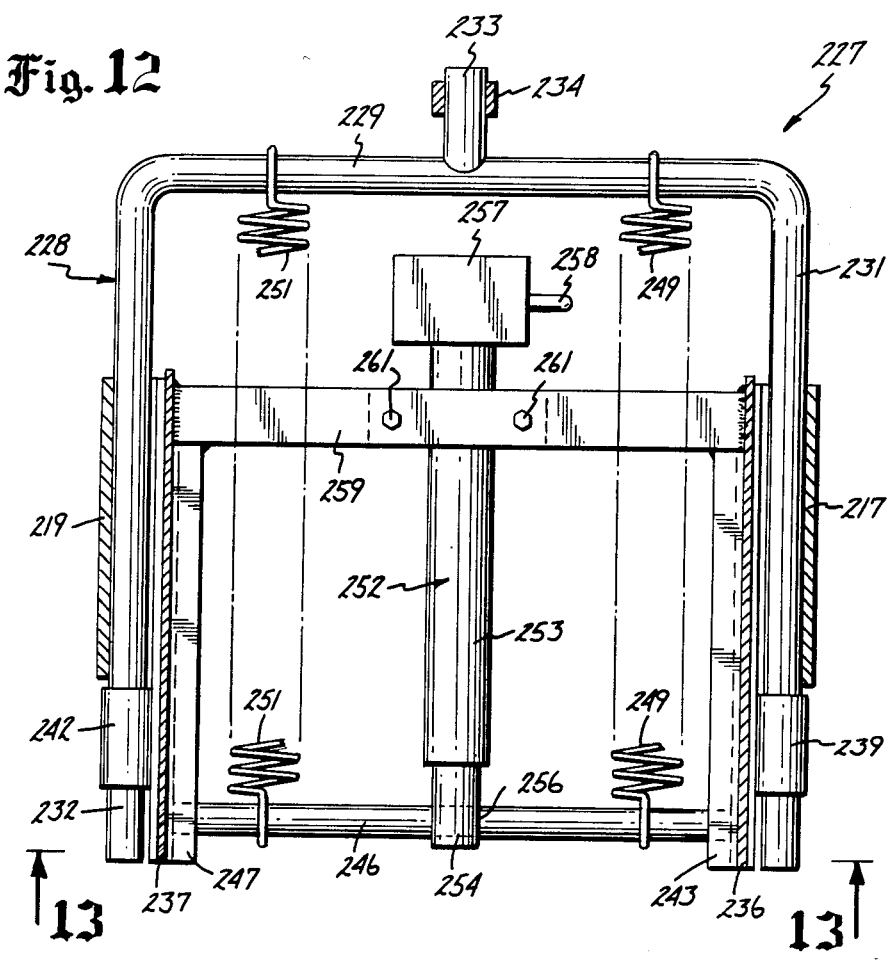
FIG. 12 is an enlarged sectional view taken along the line 12—12 of FIG. 11.
Figure 13:
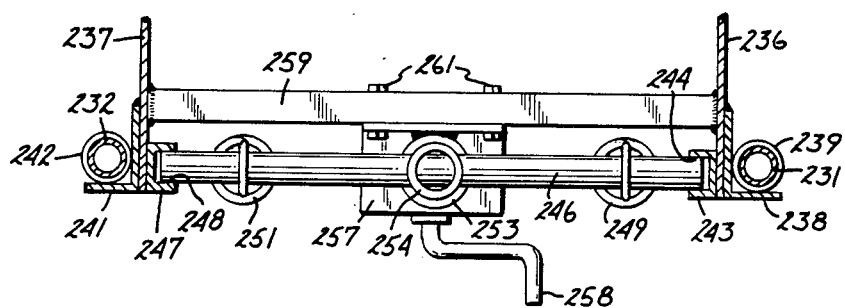
FIG. 13 is a sectional view taken along the line 13—13 of FIG. 12.

In long conveyor assemblies, the long belt 123 is also automatically tensioned with a second belt tensioning assembly indicated generally at 227 in FIGS. 12 and 13. The belt tension assembly 227 is substantially the same as belt tension assembly 167 and operates to automatically maintain tension on belt 123. Belt tension assembly 227 has a movable yoke 228 having a transverse or cross member 229 and a pair of longitudinal legs 231 and 232. The mid-section of cross member 229 has a longitudinal neck 233 slidably disposed in a sleeve 234. Sleeve 234 is fixed to the frame with a cross member (not shown). Legs 231 and 232 are located adjacent outsides of longitudinal frame plates 236 and 237 secured to table 97. Leg 231 is located along an angle member 238 secured to frame 236. Angle member 238 carries a sleeve 239 accommodating an end portion of leg 231. A second angle member 241 is secured to the outside of frame plate 237. Angle member 241 carries a sleeve 242 accommodating end portion of leg 232.

A first channel member 243 is longitudinally located along the inside of frame plate 236 and secured thereto. Channel member 243 has a longitudinal channel or groove 244 accommodating an end of a cross bar 246. The opposite end of cross bar 246 is slidably located in a channel or groove 248 of a second channel member 247 secured to the inside of frame plate 237.

A pair of coil tension springs 249 and 251 are connected to cross member 229 of the yoke 228 and the cross bar 246. A linear actuator indicated generally at 252 is longitudinally positioned between springs 249 and 251. Linear actuator 252 has a cylindrical housing 253 slidably accommodating a movable member or piston 254. The outer end of piston 254 has a transverse hole 256 accommodating the center of cross bar 246. The piston 254 is moved into and out of an end of housing 253 with a gear box 257 operable with a hand crank 258 to selectively extend and contract the linear actuator 252. Housing 253 is fixed to a cross frame member 259 with a plurality of fasteners 261 and a bracket (not shown). The ends of frame member 259 are attached to linear actuator 252 operable to move cross bar 246 in the direction of the arrow 262 thereby applying tension to springs 249 and 252. This translates into tension on belt 123 as the idler roller 213 is rotatably mounted on plates 217 and 219 attached to yoke 228. The actuator 252 is operated to adjust the tension on springs 249 and 251 and thereby automatically adjust the tension on belt 123.

While there has been shown and described the embodiment of the material conveying apparatus having an automatic belt tensioner, it is intended that changes in the structure and arrangement of the structure can be made by one skilled in the art without departing from the invention. The invention is defined in the following claims.

The embodiments of the invention in which an exclusive property or privilege is claimed are defined as follows:

1. An apparatus for tensioning an endless belt comprising:
    a fixed support having first and second opposite side members, pulley means for engaging an arcuate end section of an endless belt associated with said support, said belt being movable in a longitudinal direction, a U-shaped tensioning frame including first and second parallel legs connected by a transverse cross member and located adjacent said first and second opposite side members and movably mounted on said support, means rotatably mounting said pulley means on said tensioning frame, first guide means on the first and second support side members mounting said legs of the tensioning frame on said support for linear movement in a direction parallel to said legs to apply tension on the endless belt by shifting said pulley means carried thereby, a tension-enhancing element for said frame having first and second transverse ends, second guide means on the first and second support side members movably mounting the transverse ends of said element on the support for independent movement in the same direction of movement as said tensioning frame, biasing means disposed between said first and second parallel legs connecting said tensioning frame cross member with said tension-enhancing element to bias said tensioning frame in the direction to shift the pulley means to apply tension on the belt, expandable and contractible means disposed between said frame parallel legs having a fixed portion connected to said support and a movable portion connected to said tension-enhancing element, said expandable and contractible means being adjustable by movement of the movable portion with respect to the fixed portion to shift and hold said tension-enhancing element in a selected position relative to said support to adjust the biasing force of the biasing means, drive means including a motor and power transmitting means drivably connecting the motor to the pulley means for rotating said pulley means, and means mounting said motor on said tensioning frame whereby the motor, power transmitting means and pulley means move with the tensioning frame.

2. The apparatus of claim 1 including upstanding plates secured to said respective parallel legs, and wherein said pulley means is journalled between said plates.

3. The apparatus of claim 1 wherein said first guide means mounting said tensioning frame legs on said support includes a pair of parallel tubular members on said first and second support side members respectively slidably accommodating free ends of the tensioning frame legs.

4. The apparatus of claim 1 wherein said second guide means movably mounting the transverse ends of said tension-enhancing element on said support comprises parallel track means on said first and second support side members, and said tension-enhancing element is a transverse member having said end portions located in said track means.

5. The apparatus of claim 1 wherein said biasing means includes a plurality of tension springs.

6. The apparatus of claim 4 wherein said biasing means comprise a plurality of tension springs connected between said transverse member and the cross member of said tensioning frame.

7. The apparatus of claim 1 wherein said expandable and contractible means is a linear actuator having a fixed portion secured to said support between said tensioning frame legs and a movable portion secured to said tension-enhancing element.

8. The apparatus of claim 7 wherein said linear actuator includes a bear box and a hand crank operable to operate the gear box whereby on movement of the hand crank, the movable portion shifts said tension-enhancing element to change the biasing force of said biasing means.

9. The apparatus of claim 1 wherein said drive means includes a first tensioning roller carried by said tensioning frame, said tensioning roller extending parallel to said pulley means in proximity thereto such that the endless belt wraps about said pulley means more than 180°, and wherein said drive means includes means for driving said tensioning roller at a higher speed than said pulley means.

10. An apparatus for driving and tensioning an endless belt having a first run, an arcuate end section and a second run, comprising:
    a support, drive pulley means rotatably mounted on the support engageable with an arcuate end section of the belt;

roller means engageable with the second run of the belt adjacent the drive pulley means;

drive means including a motor and first power transmitting means connecting the motor to the roller means, for rotating the roller means at a speed such that the outer surface of the roller means moves at a speed so that the roller means maintains the section of the belt between the roller means and drive pulley means under tension, and second power-transmitting means separate from the first power transmitting means drivably connecting the roller means with the drive pulley means to rotate the drive pulley means to move the belt simultaneously with rotation of the roller means whereby the arcuate end section of the belt is maintained in engagement with the pulley means;

a U-shaped tensioning frame including parallel legs movably mounted on said support;

means rotatably mounting said roller means on said tensioning frame;

means mounting said legs of the tensioning frame on said support for linear movement in a direction parallel to said legs to apply tension on the endless belt by shifting said roller means carried thereby;

a tension-enhancing element for said frame, means movably mounted said element on the support for movement in the same direction of movement as said tension frame;

biasing means disposed between said parallel legs connecting said tensioning frame with said tension-enhancing element to bias said tensioning frame in the direction to shift the roller means to apply tension on the belt;

expandable and contractible means disposed between said frame parallel legs and connected between said frame and said tension-enhancing element, said expandable and contractible means being adjustable to shift and hold said tension-enhancing element in a selected position relative to said support to adjust the biasing force of the biasing means.

* * * * *